(12) United States Patent
Harubeppu et al.

(10) Patent No.: US 12,146,816 B2
(45) Date of Patent: Nov. 19, 2024

(54) TEST JIG AND TEST METHOD

(71) Applicant: Hitachi, Ltd., Tokyo (JP)

(72) Inventors: Yu Harubeppu, Tokyo (JP); Hisashi Tanie, Tokyo (JP); Hiroshi Shintani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 18/023,782

(22) PCT Filed: Mar. 2, 2021

(86) PCT No.: PCT/JP2021/007900
§ 371 (c)(1),
(2) Date: Feb. 28, 2023

(87) PCT Pub. No.: WO2022/054309
PCT Pub. Date: Mar. 17, 2022

(65) Prior Publication Data
US 2023/0324255 A1 Oct. 12, 2023

(30) Foreign Application Priority Data
Sep. 8, 2020 (JP) ................................ 2020-150306

(51) Int. Cl.
*G01M 7/06* (2006.01)
(52) U.S. Cl.
CPC ..................................... *G01M 7/06* (2013.01)
(58) Field of Classification Search
CPC ............ G01M 7/06; G01M 7/00; G01M 7/02; G01M 7/08
See application file for complete search history.

(56) References Cited

U.S. PATENT DOCUMENTS

| | | | |
|---|---|---|---|
| 5,635,642 A * | 6/1997 | Nonomura | G01C 19/5607 73/504.16 |
| 2008/0092662 A1 | 4/2008 | Mizuguchi | |

(Continued)

FOREIGN PATENT DOCUMENTS

| | | |
|---|---|---|
| CN | 106500940 A | 3/2017 |
| CN | 210293598 U | 4/2020 |

(Continued)

OTHER PUBLICATIONS

International Search Report (PCT/ISA/210) issued in PCT Application No. PCT/JP2021/007900 dated May 11, 2021 with English translation (six (6) pages).

(Continued)

*Primary Examiner* — Suman K Nath
(74) *Attorney, Agent, or Firm* — Crowell & Moring LLP

(57) ABSTRACT

A vibration generation device which can vibrate in only one axial direction is used to simultaneously load a vibration force in a plurality of axial directions onto a test piece, and to make it possible to easily modify the proportion of vibration force in each axial direction. The present invention includes: a vibration generation device connection part 1 which is connected to the vibration generation device and is vibrated in a z-axis direction; a first diaphragm 2 which is connected to the vibration generation device connection part 1 and extends in cantilevered form in an x-axis direction intersecting the z-axis direction; a second diaphragm 3 which is connected to the vicinity of an end of the first diaphragm 2 in the x-axis direction, and which extends in cantilevered form in the z-axis direction and a y-axis direction intersecting the x-axis direction; and a test piece installation part 5 on which the test piece is installed and which receives vibrations via the first diaphragm 2 and the second diaphragm 3 from the vibration generation device connection part 1, wherein at least one of the first diaphragm 2 and (Continued)

the second diaphragm 3 has a length adjustment mechanism 6.

12 Claims, 9 Drawing Sheets

(56) References Cited

U.S. PATENT DOCUMENTS

| | | | | |
|---|---|---|---|---|
| 2009/0249899 A1* | 10/2009 | Wong | .................. | G01M 7/06 |
| | | | | 73/865.6 |
| 2011/0041617 A1* | 2/2011 | Cotrell | ................ | G01M 7/025 |
| | | | | 73/660 |
| 2017/0322109 A1* | 11/2017 | Canfield | ................ | G01M 7/02 |
| 2018/0351481 A1* | 12/2018 | Okada | .................. | H02N 2/18 |

FOREIGN PATENT DOCUMENTS

| | | | |
|---|---|---|---|
| JP | 63-78038 | A | 4/1988 |
| JP | 10-73512 | A | 3/1998 |
| JP | 2000-55777 | A | 2/2000 |
| JP | 2000-258290 | A | 9/2000 |
| JP | 2006-337086 | A | 12/2006 |

OTHER PUBLICATIONS

Japanese-language Written Opinion (PCT/ISA/237) issued in PCT Application No. PCT/JP2021/007900 dated May 11, 2021 (four (4) pages).

* cited by examiner

TEST JIG AND TEST METHOD

TECHNICAL FIELD

The present invention relates to a test jig and a test method.

BACKGROUND ART

There is a test technique called a Highly Accelerated Limit Test (HALT) in which an excessive load such as temperature and vibration is applied to a prototype at a product design stage, and a fragile portion is grasped at an early stage when the prototype is commercialized. As a test apparatus suitable for such a test technique, for example, a HALT apparatus capable of simultaneously applying random vibration and temperature rapid change in multi-axis directions has been commercialized.

On the other hand, vibration generating apparatuses capable of vibrating only in a uniaxial direction are also widely used, and are mainly used for verification of reliability of a product against vibration. As a technique related to the vibration generating apparatus capable of vibrating in the uniaxial direction and a test jig thereof, for example, those described in PTLs 1 and 2 are known.

CITATION LIST

Patent Literatures

PTL 1: JP 2000-055777 A
PTL 2: JP 2000-258290 A
PTL 3: JP 10-073512 A

SUMMARY OF INVENTION

Technical Problem

Usually, a HALT-dedicated apparatus is used during a HALT test. In addition to the high cost of the apparatus itself, the HALT-dedicated apparatus generally consumes a large amount of liquid nitrogen and electric power when the apparatus is cooled or the test environment temperature is rapidly changed, and thus there is a problem that the cost required for evaluation is increased as compared with the case of using a uniaxial test apparatus. Therefore, there is a demand for evaluation at lower cost.

On the other hand, depending on a failure mode of the product, there is known an event in which a life is shortened in a case where vibration is simultaneously applied in a plurality of axial directions as compared with a case of vibrating in each uniaxial direction. In addition, depending on the product, sample evaluation can be performed by using a test apparatus as described in PTL 3, for example, without using the HALT-dedicated apparatus.

PTL 3 discloses a test apparatus capable of extracting a fragile portion by attaching a sample to an inclined jig by using a vibration tester that vibrates the sample in one direction and measures an excitation intensity, and applying a vibration force due to a component force in a vertical direction and an excitation force by a component force in a horizontal direction to the sample by vibrating the sample in one direction. With such a test apparatus, the cost for evaluation can be reduced.

However, in the test apparatus of PTL 3, there is a problem that it is difficult to independently adjust the excitation force in the vertical direction and the excitation force in the horizontal direction applied to the sample. Therefore, in order to extract a fragile portion, there is a demand for a test jig capable of simultaneously vibrating a sample in a plurality of axial directions by attaching the test jig to a vibration generating apparatus capable of vibrating only in a uniaxial direction and easily changing the excitation force in each axial direction at various ratios.

The present invention has been made in view of the above problems, and an object of the present invention is to provide a test jig and a test method capable of simultaneously applying excitation forces in a plurality of axial directions to a test piece and easily changing a ratio of the excitation forces in the respective axial directions by using a vibration generating apparatus capable of vibrating only in a uniaxial direction.

Solution to Problem

In order to solve the above problems, one of typical test jigs of the present invention is a test jig including:
  a vibration generating apparatus coupling unit that is able to be coupled to a vibration generating apparatus and is vibrated in a z-axis direction;
  a first diaphragm that is coupled to the vibration generating apparatus coupling unit and extends in a cantilever manner in an x-axis direction intersecting the z-axis direction;
  a second diaphragm that is coupled to a vicinity of an x-axis direction end portion of the first diaphragm and extends in a cantilever manner in a y-axis direction intersecting the z-axis direction and the x-axis direction; and
  a test piece installation portion on which the test piece is able to be installed and which receives vibration from the vibration generating apparatus coupling unit via the first diaphragm and the second diaphragm,
  in which at least one of the first diaphragm and the second diaphragm includes a length adjusting mechanism.

Advantageous Effects of Invention

According to the present invention, it is possible to provide a test jig and a test method capable of simultaneously applying excitation forces in a plurality of axial directions on a test piece and easily changing a ratio of the excitation forces in the respective axial directions by using a vibration generating apparatus capable of vibrating only in a uniaxial direction.

Problems, configurations, and effects other than those described above will be clarified by the following description of embodiments.

DESCRIPTION OF EMBODIMENTS

Hereinafter, preferred embodiments of the present invention will be described with reference to the drawings as appropriate. However, the present invention is not limited to the embodiments described herein, and can be appropriately combined and improved without changing the gist.

In the present specification, an "effective length of a diaphragm" refers to a distance between points at which the axes of the diaphragm intersect when another diaphragm is joined to both ends of the diaphragm, and refers to a distance between a point at which the axis of the diaphragm intersects the joining portion on one end side and a point at which the axis of the diaphragm intersects the axis of another diaphragm on the other end side when one end of the diaphragm is joined to the vibration generating apparatus coupling unit or the test piece installation portion and the other end of the diaphragm is joined to another diaphragm. Further, a "length adjusting apparatus" refers to one that is used to adjust the effective length of the diaphragm.

In the following embodiment, a case where the x-axis direction, the y-axis direction, and the z-axis direction are orthogonal to each other (orthogonal coordinate system) will be described as an example. However, the present invention is similarly applicable to a case where the x-axis direction, the y-axis direction, and the z-axis direction obliquely intersect with each other (oblique coordinate system).

First Embodiment

Figure 1:
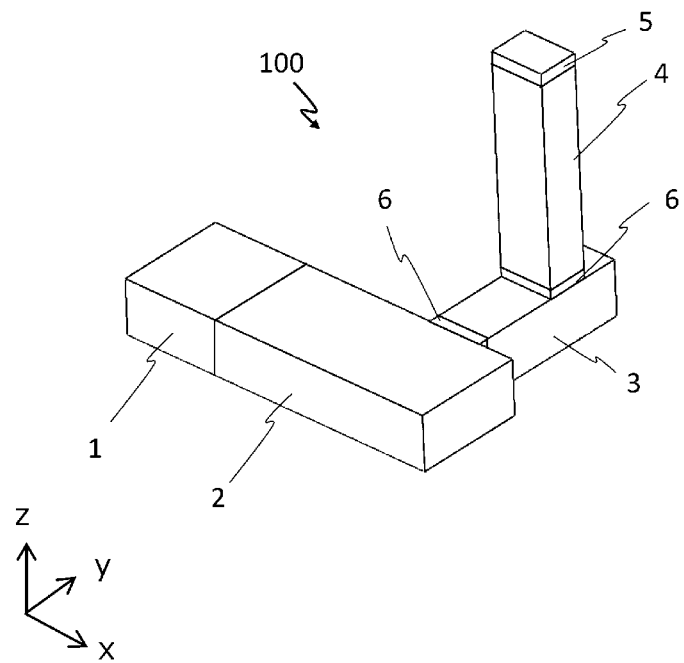
FIG. 1 is a schematic perspective view illustrating a structure of a test jig according to a first embodiment.

FIG. 1 is a schematic perspective view illustrating a structure of a test jig. A test jig 100 includes a vibration generating apparatus coupling unit 1, a first diaphragm 2, a second diaphragm 3, a third diaphragm 4, and a test piece installation portion 5. The vibration generating apparatus coupling unit 1 is coupled to a vibration generating apparatus 9 (see FIGS. 4 and 5) capable of vibrating in a uniaxial direction using a bolt or the like.

Here, a vertical direction is defined as a z-axis direction, and directions orthogonal to the z-axis direction are defined as an x-axis direction and a y-axis direction. The x-axis direction and the y-axis direction are orthogonal to each other.

The first diaphragm 2 is coupled adjacent to the vibration generating apparatus coupling unit 1, and extends in a cantilever manner in the x-axis direction orthogonal to a vibration direction (z-axis direction) of the vibration generating apparatus. The second diaphragm 3 is coupled to a vicinity of an end portion of the first diaphragm 2 and extends in a cantilever manner in the y-axis direction. The third diaphragm 4 is coupled to a vicinity of an end portion of the second diaphragm 3 and extends in the z-axis direction. That is, the first diaphragm 2, the second diaphragm 3, and the third diaphragm 4 are orthogonal to each other. The test piece installation portion 5 is located in a vicinity of an end portion of the third diaphragm 4, and can fix a test piece to be tested using a bolt or the like.

The test jig 100 has a larger resonance frequency as its mass is smaller and its rigidity is higher, so that it is easy to avoid resonance of the test jig in a test frequency band. Therefore, it is desirable to use a material having a small specific gravity and high rigidity as a material of the test jig.

In addition, it is desirable to use a material having sufficient strength and fatigue strength capable of suppressing deformation, damage, and fatigue fracture due to a load during a vibration test.

As a material of the test jig 100, for example, a metal such as iron, aluminum, or an alloy containing them as a main component, or a composite material such as Fiber Reinforced Plastics (FRP) may be used. Metal generally has an advantage of excellent workability. On the other hand, the composite material generally has an advantage of having high rigidity and strength while having a small specific gravity.

Cross-sectional shapes of the first diaphragm 2, the second diaphragm 3, and the third diaphragm 4 may be a rectangular shape having a cavity therein or an H-shape in addition to a solid rectangular shape as illustrated in FIG. 1. In a case where the cross-section is the solid rectangle, for example, there is an advantage that it is easy to secure a screw hole for fastening and the like and it is easy to process and attach. On the other hand, in the case where the cross section is rectangular or H-shaped, there is an advantage that the mass can be reduced without greatly reducing the rigidity as compared with the case of the solid rectangle.

At least one of the first diaphragm 2, the second diaphragm 3, and the third diaphragm 4 has a length adjusting mechanism 6. The length adjusting mechanism 6 is a mechanism for relatively changing an effective length of each of the first diaphragm 2, the second diaphragm 3, and the third diaphragm 4 in a path coupling the vibration generating apparatus coupling unit 1 to the test piece installation portion 5.

Figure 2:
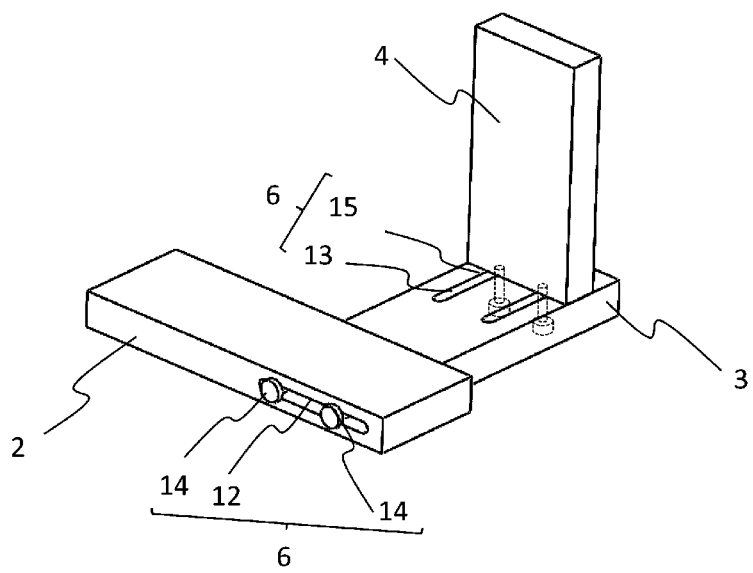
FIG. 2 is a view illustrating an example of a length adjusting mechanism.
Figure 3:
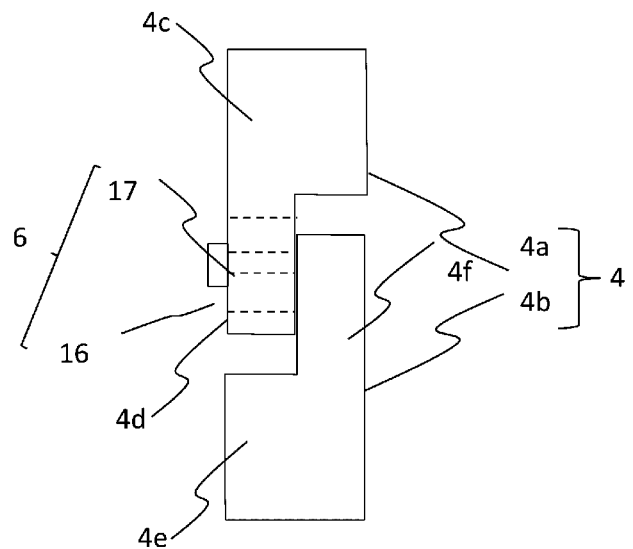
FIG. 3 is a view illustrating an example of a length adjusting mechanism.

FIGS. 2 and 3 illustrate an example of the length adjusting mechanism 6. For example, as illustrated in FIG. 2, first diaphragm 2 is provided with a hole (also referred to as elongated hole, the same shall apply hereinafter) 12 having an elongated hole shape and facing the second diaphragm 3, and a pin (also referred to as a fastening body) 14 having a male screw formed at a tip thereof is passed through the hole 12 and screwed into a female screw hole of the second diaphragm 3, and the pin 14 is strongly fastened to fix a position with respect to the first diaphragm 2. By loosening the pin 14 and allowing relative movement along the hole 12 having an elongated hole shape, the second diaphragm 3 can be moved in a longitudinal direction of the first diaphragm 2. With this mechanism, the effective length of the first diaphragm 2 can be changed in the path coupling the vibration generating apparatus coupling unit 1 to the test piece installation portion 5. The pin 14 and the hole 12 constitute the length adjusting mechanism 6. As the fastening body, a general-purpose bolt can be used instead of the pin.

Similarly, the second diaphragm 3 is provided with a hole 13 having an elongated hole shape and facing the second diaphragm 3, and a pin 15 having a male screw formed at a tip thereof is passed through the hole 13 to be screwed into the female screw hole of the third diaphragm 4, and the pin 15 is strongly fastened to fix a position with respect to the second diaphragm 3. By loosening the pin 15 and allowing relative movement along the hole 13 having an elongated hole shape, the third diaphragm 4 can be moved in a longitudinal direction of the second diaphragm 3. With this mechanism, the effective length of the second diaphragm 3 can be changed in the path coupling the vibration generating apparatus coupling unit 1 to the test piece installation portion 5. The pin 15 and the hole 13 constitute the length adjusting mechanism 6.

FIG. 3 is a side view illustrating only the vicinity of the third diaphragm 4. For example, as illustrated in FIG. 3, the third diaphragm 4 is formed by combining two members 4a and 4b. The upper member 4a is continuously provided with a thick plate portion 4c and a thin plate portion 4d protruding downward from the thick plate portion 4c. In addition, the lower member 4b is continuously provided with a thick plate portion 4e and a thin plate portion 4f protruding upward from the thick plate portion 4e and slidably in surface contact with the thin plate portion 4d. Thicknesses of the thick plate portions 4c and 4e are equal to each other, and thicknesses of the thin plate portions 4d and 4f are equal to each other, and are ½ of the thicknesses of the thick plate portions 4c and 4e.

The thin plate portion 4d is provided with a hole 16 having an elongated hole shape and extending in a vertical direction opposite to the thin plate portion 4f, a pin 17 having a male screw formed at a tip thereof is passed through the hole 16 and screwed into the female screw hole of the thin plate portion 4f, and the pin 17 is strongly fastened to fix the position. By loosening the pin 17 and allowing relative movement along the hole 16 having an elongated hole shape, the distance between the thick plate portions 4c and 4e of the third diaphragm 4 can be changed, whereby the overall length of the third diaphragm 4, that is, the effective length can be changed. The pin 17 and the hole 16 constitute the length adjusting mechanism 6.

Although an example of the length adjusting mechanism 6 has been described here, for example, the mechanism illustrated in FIG. 3 may be applied to the first diaphragm 2 or the second diaphragm 3. In addition, FIGS. 2 and 3 illustrate examples in which the pin 14, the pin 15, and the pin 17 are loosened to change the positions of the respective members. However, for example, an actuator may be provided at a position corresponding to the pin 14, the pin 15, and the pin 17 to adjust the relative positions of the respective members. In such a case, it is a problem to secure reliability so that the actuator is not damaged by an excitation load at the time of the vibration test, but there is an advantage that the effective length can be adjusted by operating the actuator even in the middle of the vibration test.

Figure 4:
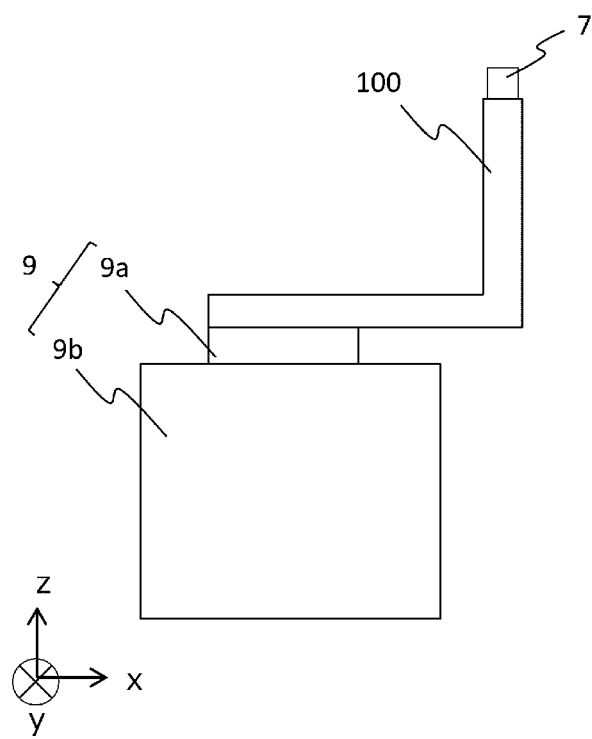
FIG. 4 is a schematic side view before starting a vibration test.
Figure 5:
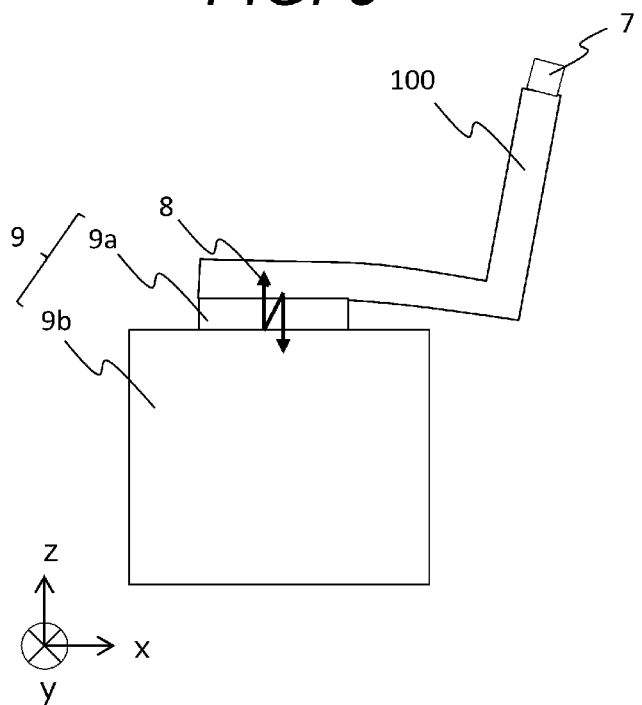
FIG. 5 is a modified view during a vibration test.

The operation of the test jig 100 will be described with reference to FIGS. 4 and 5. FIG. 4 is a schematic side view before starting the vibration test, and FIG. 5 is a schematic view of a deformed shape at a certain moment when the vibration test is performed from the state of FIG. 4. A deformation amount is illustrated in an enlarged manner for easy understanding.

As illustrated in FIG. 4, in the test jig 100, a vibration generating apparatus coupling unit (not illustrated in FIG. 4) on one end side is coupled to the vibration generating apparatus 9 and extends in an L shape, and the test piece 7 is attached to a test piece installation portion (not illustrated in FIG. 4) on the other end side. The vibration generating apparatus 9 includes a vibration unit 9a and a vibration generating apparatus main body 9b. During the vibration test, as illustrated in FIG. 5, the vibration unit 9a vibrates only in the z-axis direction. However, since a bending deformation occurs in the test jig 100 as illustrated in FIG. 5, not only an acceleration of a z-axis direction component but also an acceleration of an x-axis direction component is generated in the test piece 7.

Similarly, the test jig 100 is also bent and deformed in the y-axis direction perpendicular to the paper surface, and an acceleration of a y-axis direction component is generated in the test piece 7. As described above, by using the test jig 100, it is possible to simultaneously apply excitation forces in the plurality of axial directions to the test piece 7 by the vibration generating apparatus 9 that can vibrate only in a uniaxial direction.

In order to generate accelerations of the same order of magnitude in each of the x-axis direction, the y-axis direction, and the z-axis direction, it is necessary to determine appropriate dimensions of the jig according to the mass of the test piece 7 and the material of the test jig 100. In addition, when resonance occurs in the test frequency band, excessive acceleration occurs only at a specific frequency, and a target test cannot be performed this time. Therefore, it is necessary to appropriately determine a resonance frequency of the jig.

Hereinafter, a method for determining an appropriate dimension of a jig will be described. First, for easy understanding, a method of generating accelerations of the same order in each of the x-axis direction and the z-axis direction and avoiding resonance within the test frequency will be described by considering a two-dimensional case of an xz coordinate system.

Figure 6:
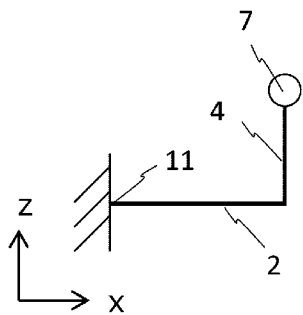
FIG. 6 is a view illustrating a two-dimensional material mechanics model.

FIG. 6 is a schematic view schematically illustrating the test jig 100 in the xz coordinate system by a material mechanics model. In order to consider only deformation of the xz coordinate system, the second diaphragm 3 existing in the direction perpendicular to the paper surface is omitted here. The test piece 7 is assumed to be a mass point. The third diaphragm 4 represented by a beam and the first diaphragm 2 are coupled to the test piece 7. The deformation of the end portion of first diaphragm 2 is restrained by a fixed end 11, and a state where the first diaphragm 2 is coupled to the vibration generating apparatus by a bolt is modeled.

Figure 7:
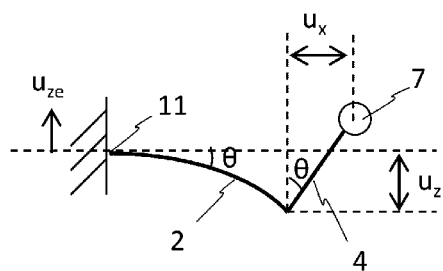
FIG. 7 is a modified view of a two-dimensional material mechanics model.

FIG. 7 illustrates a model shape when deformation similar to that in FIG. 5 occurs at a certain moment during the vibration test. $u_{ze}$ is a z-axis displacement of the fixed end 11 caused by excitation by the vibration generating apparatus. The first diaphragm 2 is bent and deformed at a deflection angle θ and a deflection amount $u_z$, and accordingly, displacement $u_x$ in the x-axis direction is also generated in the test piece 7.

Figure 8:
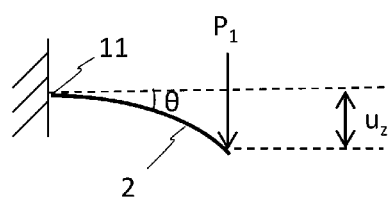
FIG. 8 is a modified view of a first diaphragm in a two-dimensional material mechanics model.

FIG. 8 illustrates only the first diaphragm 2 in the model illustrated in FIG. 7. At this time, when a load acting on the tip of first diaphragm 2 is set to $P_1$, $u_z = P_1 L_1^3/(3EI_1)$ and θ=$P_1 L_1^2/(2EI_1)$ are represented from a basic equation of deformation of the beam in material mechanics. Here, $L_1$ is an effective length of first diaphragm 2, E is a Young's modulus of the first diaphragm 2 and the third diaphragm 4, and $I_1$ is a cross-sectional secondary moment of the first diaphragm 2.

When the effective length of third diaphragm 4 is $L_3$, $u_x = L_3 \theta$ holds when $\theta$ is sufficiently small. When $u_{ze}$ is sufficiently smaller than $u_x$ and $u_z$ and $u_x = u_z$ holds, $L_3 = 2L_1/3$ is obtained from $L_3 P_1 L_1^2/(2EI_1) = P_1 L_1^3/(3EI_1)$. That is, by defining $L_1$ and $L_3$ such that the relationship of $L_3 = 2L_1/3$ is established, an acceleration of the same order can be generated in each of the x-axis direction and the z-axis direction.

Figure 9:
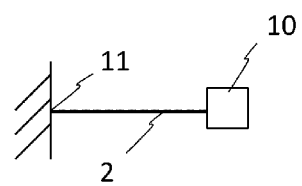
FIG. 9 is a view illustrating a two-dimensional material mechanics model.

FIG. 9 is a model in which the masses of the test piece 7 and the third diaphragm 4 are added together and expressed by a mass point as a combined mass 10. When the mode in which the first diaphragm 2 illustrated in FIG. 7 is deformed is regarded as a primary mode of a beam vibration in FIG. 9, a natural frequency $f_n$ is represented as $f_n = 1/(2\pi)\sqrt{(3EI_1/(M+m_1/4)/L_1^3)}$. Here, M is the mass of the combined mass 10, and $m_1$ is the mass of first diaphragm 2. Therefore, $f_n$ may not be included in the test frequency.

For example, a case where the mass of the test piece 7 is $m_0 = 0.5$ kg, the materials of the first diaphragm 2 and the third diaphragm 4 are iron having a density of 7.85 g/cm$^3$ and a Young's modulus of 200 GPa, and the test frequency band is 1000 Hz or less is considered. In this case, when the cross-sectional shapes of the first diaphragm 2 and the third diaphragm 4 are solid rectangles, for example, $L_1 = 90$ mm, $L_3 = 60$ mm, and plate thicknesses $t_1$ and $t_3$ of the first diaphragm 2 and third diaphragm 4 are respectively set to $t_1 = t_3 = 30$ mm, and plate width b=100 mm. In this case, the resonance frequency becomes 1390 Hz and is not included in the test frequency range. Therefore, the above condition is satisfied.

Figure 10:
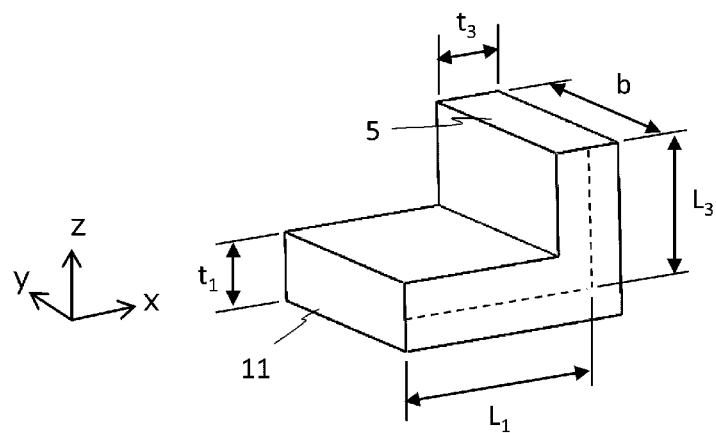
FIG. 10 is a view illustrating a finite element analysis model.

FIG. 10 illustrates an analysis model used in a finite element analysis for verification. Deformation was restrained by the fixed end 11, a mass $m_0 = 0.5$ kg was set to be uniformly distributed in the test piece installation portion 5, and an acceleration in the z-axis direction was applied to the entire model.

Figure 11:
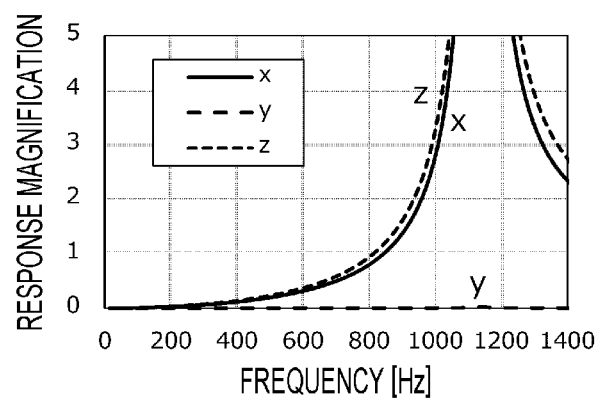
FIG. 11 is a view illustrating a finite element analysis result.

FIG. 11 illustrates response magnifications of accelerations in the x-axis direction, the y-axis direction, and the axial direction. Almost no acceleration was generated in the y-axis direction, and the same acceleration was generated in the x-axis direction and the z-axis direction. In addition, the resonance frequency exceeded 1000 Hz as estimated.

Figure 12:
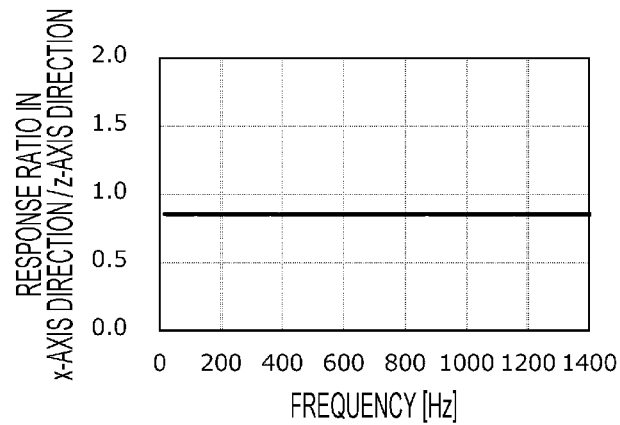
FIG. 12 is a view illustrating a finite element analysis result.

FIG. 12 illustrates a ratio of the response magnifications in the z-axis direction and the x-axis direction illustrated in FIG. 11. In the calculation in a material mechanics model, since the influence or the like of the thickness of the actual structure on the deformation is not considered, the response ratio does not exactly coincide with 1.0, but becomes about 0.8 in a range of the test frequency band of 1000 Hz or less, and it can be verified that acceleration of the same order can be generated in each of the x-axis direction and the z-axis direction as intended.

By changing $L_1$ and $L_3$, the acceleration can be generated at an arbitrary ratio in each of the x-axis direction and the z-axis direction. This ratio is referred to as a response ratio. Examples of the response ratio are illustrated in FIGS. 13 and 14.

Figure 13:
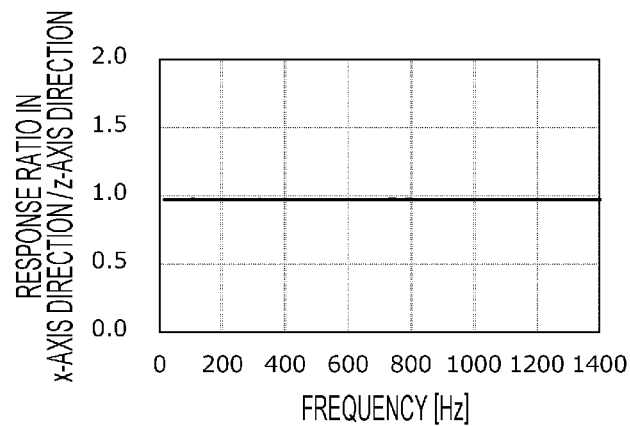
FIG. 13 is a view illustrating a finite element analysis result.
Figure 14:
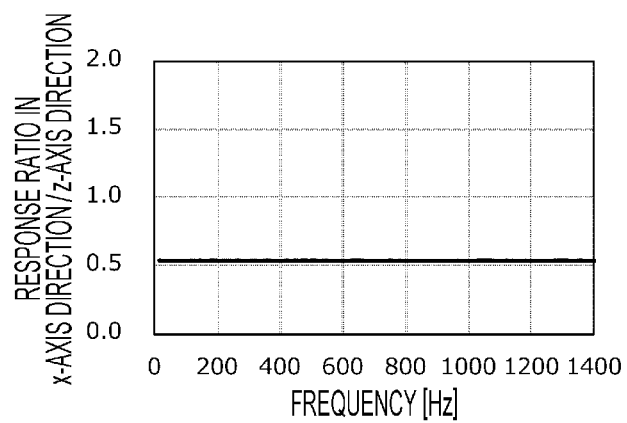
FIG. 14 is a view illustrating a finite element analysis result.

FIG. 13 is a finite element analysis result in a case of $L_1 = 100$ mm and $L_3 = 75$ mm. The response ratio in the z-axis direction and the x-axis direction can be set to 1.0. FIG. 14 is a finite element analysis result in a case of $L_1 = 100$ mm and $L_3 = 45$ mm. From FIG. 14, the response ratio in the z-axis direction and the x-axis direction can be set to about 0.5.

Although the two-dimensional case of the xz coordinate system has been described above, the appropriate dimensions of the test jig can be determined by a similar method in the three-dimensional case of the xyz coordinate system. When the deformation of the second diaphragm 3 ignored in the two-dimensional examination is regarded as bending of the beam similar to FIG. 8 and the load generated at the tip of the beam is $P_2$, similarly, a deflection amount $u_{z2} = P_2 L_2^3/(3EI_2)$ and a deflection angle $\theta_2 = P_2 L_2^2/(2EI_2)$ are obtained, and the y-axis direction displacement $u_y$ of the test piece 7 is $u_y = L_3 \theta_2$. Here, $L_2$ is an effective length of the second diaphragm 3, E is a Young's modulus of the second diaphragm 3, and $I_2$ is a cross-sectional secondary moment of the second diaphragm 3.

Under the same assumption as in the two-dimensional examination, when considering a case where the displacements in the x-axis direction, the y-axis direction, and the z-axis direction are equal, $u_x = u_y = u_z + u_{z2}$ holds. Therefore, $L_3 P_1 L_1^2/(2EI_1) = L_3 P_3 L_3^2/(2EI_2) = P_1 L_1^3/(3EI_1) + P_2 L_2^3/(3EI_1)$ is obtained.

Here, when $P_1$ and $P_2$ are eliminated and rearranged, $L_3 = 2(L_1 + L_2)/3$ is obtained. That is, by defining $L_1$ and $L_3$ such that the relationship of $L_3 = 2(L_1 + L_2)/3$ is established, an acceleration of the same order can be generated in each of the x, y, and z axis directions.

Also for the resonance frequency, in a case where a mode in which the first diaphragm 2 is deformed is considered, in FIG. 9, the combined mass 10 may be regarded as the sum of the masses of the test piece 7, the second diaphragm 3, and the third diaphragm 4, and the same formula as in the two-dimensional case can be used.

Figure 15:
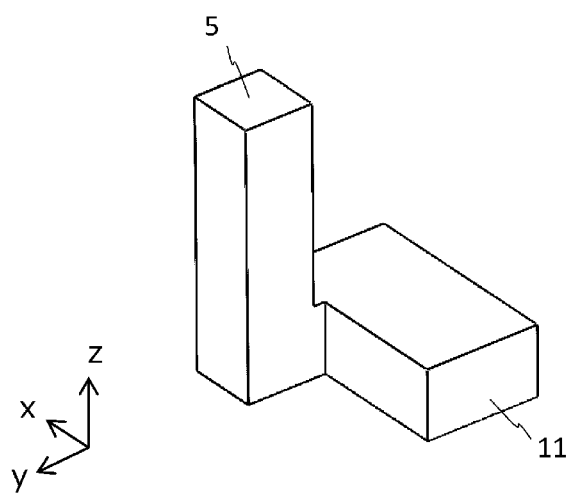
FIG. 15 is a view illustrating a finite element analysis model.

FIG. 15 illustrates a jig shape of which dimensions are selected so as to generate accelerations of the same order in each of the x-axis direction, the y-axis direction, and the z-axis direction under the same conditions as in the two-dimensional examination. The plate thicknesses are all 30 mm, $L_1 = 90$ mm, $L_2 = 60$ mm, and $L_3 = 100$ mm.

The finite element analysis was performed on this model in the same manner as in the two-dimensional examination. Deformation was restrained by the fixed end 11, a mass $m_0 = 0.5$ kg was set to be uniformly distributed in the test piece installation portion 5, and an acceleration in the z-axis direction was applied to the entire model.

Figure 16:
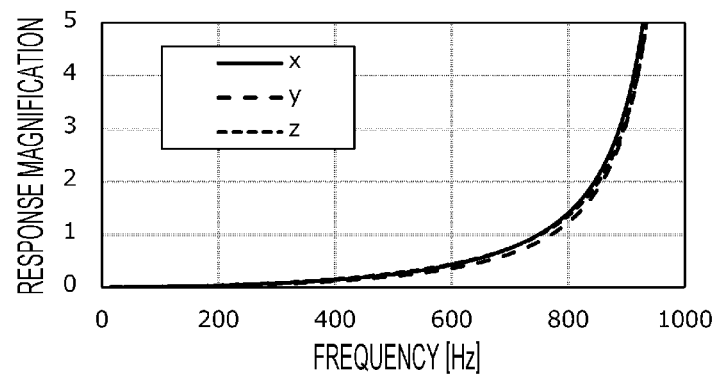
FIG. 16 is a view illustrating a finite element analysis result.
Figure 17:
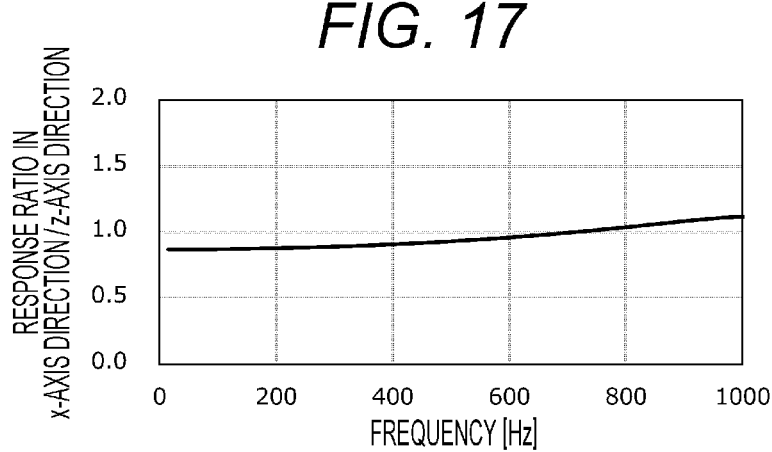
FIG. 17 is a view illustrating a finite element analysis result.
Figure 18:
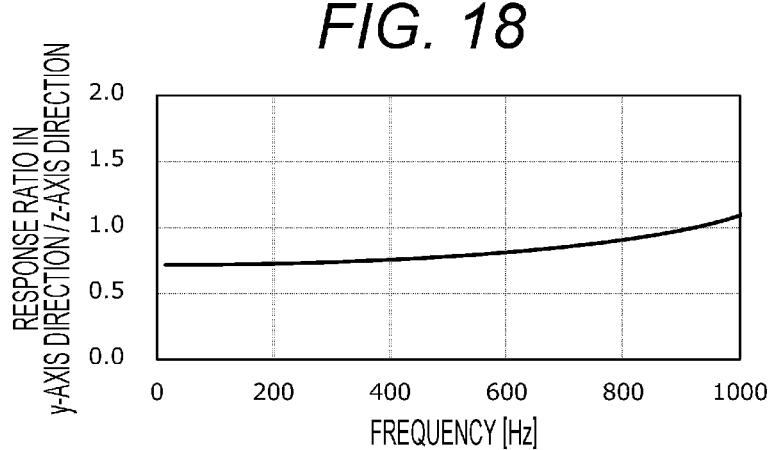
FIG. 18 is a view illustrating a finite element analysis result.

FIG. 16 illustrates the response magnifications in each of the x-axis direction, the y-axis direction, and the z-axis direction obtained as a result of the analysis. The resonance frequency exceeded 1000 Hz as estimated. FIG. 17 illustrates a ratio of the response magnification in the z-axis direction and the x-axis direction, and FIG. 18 illustrates a ratio of the response magnification in the z-axis direction and the y-axis direction. In a three-dimensional case, it was verified that the acceleration of the same order can be generated in each of the x-axis direction, the y-axis direction, and the z-axis direction similarly to the two-dimensional case.

Second Embodiment

Figure 19:
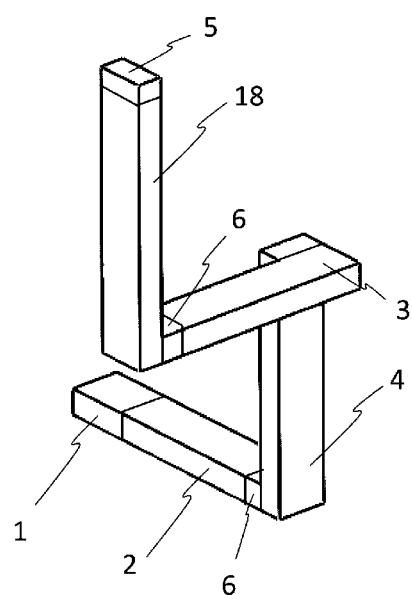
FIG. 19 is a schematic perspective view illustrating a structure of a test jig according to a second embodiment.

FIG. 19 is a schematic perspective view illustrating a second embodiment. In contrast to the first embodiment, the second embodiment includes a fourth diaphragm 18 coupled to the third diaphragm 4 via the length adjusting mechanism 6 in addition to the first diaphragm 2, the second diaphragm 3, and the third diaphragm 4. Other configurations are similar to those of the above-described embodiment, and thus redundant description will be omitted.

The fourth diaphragm 18 may not be orthogonal to any one of the first diaphragm 2, the second diaphragm 3, and the third diaphragm 4. Even in the configuration including four or more diaphragms as described above, the same effect can be obtained. Although the structure is complicated, finer adjustment can be performed.

REFERENCE SIGNS LIST 1 vibration generating apparatus coupling unit
2 first diaphragm
3 second diaphragm
4 third diaphragm
5 test piece installation portion
6 length adjusting mechanism
7 test piece
8 vibration direction
9 vibration generating apparatus
9a vibration unit
9b vibration generating apparatus main body
10 combined mass
11 fixed end
12, 13, 16 hole
14, 15, 17 pin (fastening body)
18 fourth diaphragm
100 test jig

The invention claimed is:

1. A test jig comprising:
a vibration generating apparatus coupling unit that is able to be coupled to a vibration generating apparatus and is vibrated in a z-axis direction;
a first diaphragm that is coupled to the vibration generating apparatus coupling unit and extends in a cantilever manner in an x-axis direction intersecting the z-axis direction;
a second diaphragm that is coupled to a vicinity of an x-axis direction end portion of the first diaphragm and extends in a cantilever manner in a y-axis direction intersecting the z-axis direction and the x-axis direction; and
a test piece installation portion on which the test piece is able to be installed and which receives vibration from the vibration generating apparatus coupling unit via the first diaphragm and the second diaphragm,
wherein at least one of the first diaphragm and the second diaphragm includes a length adjusting mechanism.

2. The test jig according to claim 1, wherein
the length adjusting mechanism includes an elongated hole formed in one of the first diaphragm and the second diaphragm, a female screw hole formed in the other of the first diaphragm and the second diaphragm, and a fastening body including a male screw that is able to be screwed into the female screw hole and inserted into the elongated hole,
the first diaphragm and the second diaphragm are fixed by screwing and fastening the male screw of the fastening body into the female screw hole, and
the first diaphragm and the second diaphragm are able to relatively move along the elongated hole by loosening the male screw of the fastening body from the female screw hole.

3. The test jig according to claim 2, further comprising a third diaphragm that is coupled to a vicinity of a y-axis direction end portion of the second diaphragm and extends in the z-axis direction, wherein
the test piece installation portion receives vibration from the vibration generating apparatus coupling unit via the first diaphragm, the second diaphragm, and the third diaphragm.

4. The test jig according to claim 3, wherein
the length adjusting mechanism includes an elongated hole formed in one of the second diaphragm and the third diaphragm, a female screw hole formed in the other of the second diaphragm and the third diaphragm, and a fastening body including a male screw that is able to be screwed into the female screw hole and inserted into the elongated hole,
the second diaphragm and the third diaphragm are fixed by screwing and fastening the male screw of the fastening body into the female screw hole, and
the second diaphragm and the third diaphragm are able to relatively move along the elongated hole by loosening the male screw of the fastening body from the female screw hole.

5. The test jig according to claim 3, wherein at least one of the first diaphragm, the second diaphragm, and the third diaphragm is formed by combining two members each of which is formed by continuously providing a thick plate portion and a thin plate portion, and the thin plate portions are coupled to each other via the length adjusting mechanism.

6. The test jig according to claim 3, wherein $L_3=2(L_1+L_2)/3$ holds when an effective length of the first diaphragm is $L_1$, an effective length of the second diaphragm is $L_2$, and an effective length of the third diaphragm is $L_3$.

7. The test jig according to claim 4, wherein at least one of the first diaphragm, the second diaphragm, and the third diaphragm is formed by combining two members each of which is formed by continuously providing a thick plate portion and a thin plate portion, and the thin plate portions are coupled to each other via the length adjusting mechanism.

8. The test jig according to claim 4, wherein $L_3=2(L_1+L_2)/3$ holds when an effective length of the first diaphragm is L, an effective length of the second diaphragm is $L_2$, and an effective length of the third diaphragm is $L_3$.

9. The test jig according to claim 1, further comprising a third diaphragm that is coupled to a vicinity of a y-axis direction end portion of the second diaphragm and extends in the z-axis direction, wherein
the test piece installation portion receives vibration from the vibration generating apparatus coupling unit via the first diaphragm, the second diaphragm, and the third diaphragm.

10. The test jig according to claim 9, wherein at least one of the first diaphragm, the second diaphragm, and the third diaphragm is formed by combining two members each of which is formed by continuously providing a thick plate portion and a thin plate portion, and the thin plate portions are coupled to each other via the length adjusting mechanism.

11. The test jig according to claim 9, wherein $L_3=2(L_1+L_2)/3$ holds when an effective length of the first diaphragm is $L_1$, an effective length of the second diaphragm is $L_2$, and an effective length of the third diaphragm is $L_3$.

12. A test method using the test jig according to claim 1, the test method comprising:
applying vibration including a direction other than the z-axis direction to a test piece by vibrating the vibration generating apparatus coupling unit in the z-axis direction by the vibration generating apparatus.

\* \* \* \* \*